Figure 1:
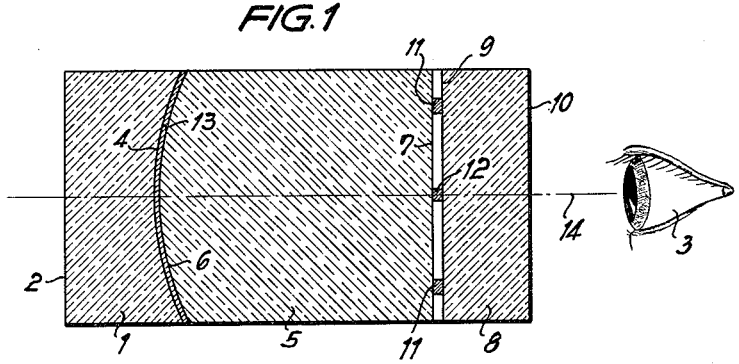

March 14, 1961     F. PAPKE     2,974,560

PHOTOGRAPHIC VIEW-FINDER

Filed Jan. 16, 1958

INVENTOR
FRIEDRICH PAPKE

BY Mock & Blum
ATTORNEYS

United States Patent Office 2,974,560
Patented Mar. 14, 1961

2,974,560
PHOTOGRAPHIC VIEW-FINDER

Friedrich Papke, Braunschweig, Germany, assignor to Voigtländer A.G., Braunschweig, Germany, a corporation of Germany Filed Jan. 16, 1958, Ser. No. 709,364

Claims priority, application Germany Jan. 30, 1957

5 Claims. (Cl. 88—1.5)

This invention relates to photographic view-finders, and it has particular relation to view-finders in which a frame, reflected into the field of the finder indicates the exact image area of the objective to which the finder belongs.

It has been known that, in photographic finders in which the image is sharply framed according to the principle of the co-called "Albada" finders, a frame is reflected into the field of the finder, and exactly indicates the image area of the objective associated with the finder, this frame being arranged in or around the path of rays of the finder. The operator observes the object to be sighted through a partially permeable spherical concave mirror and the frame arranged in the focal surface of said mirror is imaged at about the infinite.

Based on the "Albada" principle, a number of more or less satisfactory finders were developed. However, particular difficulties have been encountered in obtaining a satisfactory contrast of the reflected frame, relative to the surrounding portions of the field. Furthermore, the elimination of reflex effects was likewise difficult.

The elimination of undesired reflex effects can be obtained, for example, by a block structure of the finder, in which only a few glass-air-surfaces are present, because undesired reflex effects occur particularly at such surfaces. Such a block-shaped finder has a front lens carrying a mirror. Inwardly of this lens is a light-permeable glass block followed by an ocular lens, which latter carries the frame to be reflected arranged on a glass plate. The known constructions based on this conception use a frame which is etched in a glass plate and provided with a reflecting or mirror layer. As the imaging mirror, a spherical mirror frame was used, which leaves the finder field clear. By virtue of the reflecting frame, in finders of such structure a division of the pupil is caused in practice, which renders the use of the finder difficult insofar as an exactly defined position of the eye is required, in order to actually obtain the desired effect. Generally, no surroundings can be observed by the eye looking through the finder and the finder segment shows in most cases a smaller image angle than the limiting frame. Furthermore, the production of reflecting frames is rather expensive.

The main object of the present invention is the elimination of the above described difficulties.

It has been known that frequently parts of the frame, particularly the upper parts of the frame, appear weakly in the finder image. It has been found that this difficulty, which occurs particularly in the case of large images angles, e.g. in use of wide angle objectives, can be overcome and largely compensated by utilizing to an increased extent light derived from the upper part of the image field, i.e. mostly light coming from the sky.

Described in detail further below are two modifications of the present invention, which though generally useful in Albada-finders, can be used also in Albada-finders the structure of which is different from that corresponding to a closed block. The application of an air gap in the reflecting surface is not an indispensable condition for the success of the steps described hereinafter, which are capable of general application.

According to one embodiment of the present invention, it is contemplated that the common optical axis of the partially permeable mirror and the center of the frame to be reflected be arranged eccentrically relative to the geometrical axis of the finder, primarily in the sense of using the finder in downward direction. Thereby the extent of displacement has to be adjusted to the structural and other conditions and requirements, and can be determined by simple tests.

According to the other embodiment of the present invention, both of the above mentioned axes in the finder are coaxial. The axis of the plane frame-carrying surface, or the plane in which the frame is located, is here arranged in inclined position relative to the optical axis and, in the sense of using the finder, is preferably inclined with the upper edge toward the viewing eye. This inclined position relative to the vertical direction preferably corresponds to about 1°–5°.

The appended drawings and the following description discloses some specific embodiments of and best modes for carrying out the invention, to which the invention is not limited.

Figure 2:
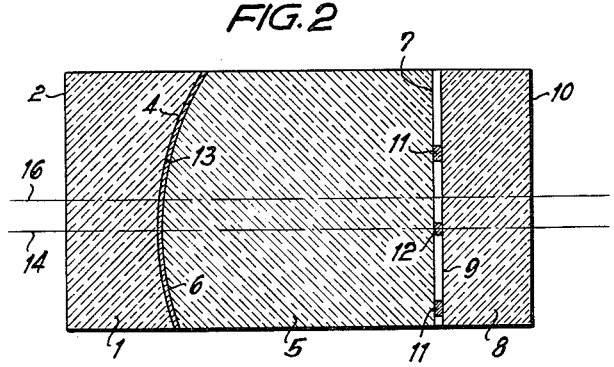
Figure 3:
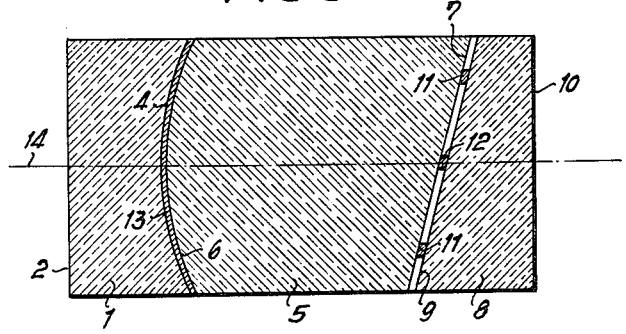

In the drawings:

Fig. 1 diagrammatically illustrates an Albada-finder of block shape in sectional view, the section being taken along the optical axis;

Fig. 2 is likewise a diagrammatical illustration of a similar finder, in which the optical axis is displaced relative to the axis of the device; and Fig. 3 is a similar illustration of a finder which has the same structural design as that shown in Fig. 1, in which however the plane, in which the frame to be reflected is located, is arranged in inclined position.

In these figures, the same or analogous parts are denoted by the same reference numerals.

Referring now to the drawings in detail, Fig. 1 illustrates a finder of the above described type, consisting of a plano-concave lens 1, the plane surface 2 of which is toward the object. This lens 1 is joined, through the semi-permeable mirror 13, by a glass body or glass block 5. The spherical surface 6 of this glass body 5, facing the object has a radius of curvature which largely corresponds to the radius of curvature of spherical surface 4 and, in the optimum case, is smaller by the thickness of mirror 13 than said last mentioned radius. Glass body 5 has, on the side toward the eye 3, a plane surface 7, which is perpendicular to the optical axis. Cemented to glass body 5 is the surface 9 of a frame carrier 8. This member 8 carries frame 11 and also a centering mark 12, at the optical axis 14, which, however, can be dispensed with, if desired. The surface 10 of member 8 facing the eye, is a plane surface, which is perpendicular to the optical axis 14. Frame 11 and mark 12, are deposited by vaporization on surface 9.

In the embodiment illustrated in Fig. 2, an improvement of this finder is attained according to the invention by arranging the optical axis 14 non-symmetrically to the geometrical design of the finder in such a manner that the optical axis is shifted in downward direction relative to the geometrical central axis 16 of the finder body in the sense of using the finder. Thereby axis 14 extends perpendicularly relative to the plane surface 9 of the frame carrier 8.

Particularly in the case of large image angles, illumination of the frame according to Fig. 1 is not always at an optimum, especially because the light incident, preferbaly from above, is reflected by the plane surface of mirror 11 in such a manner that it does not reach the eye positioned at the optical axis. Therefore, the frame will not be rich in contrast.

This defect is eliminated acording to Fig. 3 in such a manner that the axis of the cemented surface carrying the frame is arranged in an angle of about 5° relative to the optical axis. Thereby the light coming primarily from the upper part of the image field, i.e. mostly from the sky, is directed in such a manner that it essentially improves illumination of the frame.

It will be understood from the above that this invention is not limited to the specific construction, designs, dimensions and other details specifically described above and illustrated in the drawings and can be carried out with various modifications without departing from the scope of the invention as defined in the appended claims.

"To deposit by vaporising" means that an element e.g. aluminum, gold, etc. is vaporised under vacuum and that this vapor coats the surface of the lens to be treated as far as it is not covered by templets which keep that zone of the surface uncoated where the corresponding frame has to be applied.

What is claimed is:

1. A photographic finder based on the Albada-principle, comprising an image field frame apearing in the finder image and a partially permeable spherical concave mirror, through which the eye of an operator observes the object to be sighted, and which images a frame arranged near the focal plane of said mirror and illuminated by light incident from the object side and passing through said mirror, at about infinity; a first lens, a second lens spaced from said first lens, and a light-permeable block arranged between said first lens and said second lens; said mirror being arranged between said first lens and said block and the frame being carried by a plane surface of said second lens adjacent said block; the parts of the finder being assembled to form a unit with said lenses and block being laterally symmetrical about a geometrical axis, the axis of said frame being arranged asymmetrically relative to said geometrical axis of the finder with the axis of the concave mirror passing through the center of the frame in order to receive light primarily from the upper portions of the image field.

2. A photographic finder as claimed in claim 1, in which the optical axis of the partially permeable mirror and the center of the frame are arranged eccentrically relative to the geometrical axis of the finder and are perpendicular to the plane surface carrying the frame.

3. A photographic finder as claimed in claim 2, in which the optical axis of the mirror is arranged in downwardly displaced position in the sense of the use of the finder.

4. A photographic finder as claimed on claim 1, in which the surface carrying the frame is arranged in inclined position relative to the optical axis of the finder system and is inclined with its upper edge toward the eye.

5. A finder as claimed in claim 4, in which the inclination of the axis of the frame-carrying surface amounts to 1° to 5°.

References Cited in the file of this patent

UNITED STATES PATENTS

| | | |
|---|---|---|
| 1,985,067 | Wandersleb | Dec. 18, 1934 |
| 2,450,712 | Brown | Oct. 5, 1948 |
| 2,633,051 | Davis | Mar. 31, 1953 |

FOREIGN PATENTS

| | | |
|---|---|---|
| 269,447 | Germany | Jan. 22, 1914 |
| 452,644 | Germany | Nov. 15, 1927 |
| 862,934 | France | Dec. 23, 1940 |
| 996,990 | France | Sept. 5, 1951 |
| 562,233 | Great Britain | Jan. 23, 1944 |